(12) United States Patent
Fink et al.

(10) Patent No.: US 8,035,501 B2
(45) Date of Patent: Oct. 11, 2011

(54) TIRE MONITORING SYSTEM AND METHOD

(75) Inventors: Alexander Fink, Dittelbrunn (DE); Frank Fischer, Regensburg (DE); Gregor Kuchler, Regensburg (DE)

(73) Assignee: VDO Automotive AG, Regensburg (DE)

( * ) Notice: Subject to any disclaimer, the term of this patent is extended or adjusted under 35 U.S.C. 154(b) by 829 days.

(21) Appl. No.: 12/028,859

(22) Filed: Feb. 11, 2008

(65) Prior Publication Data

US 2008/0191855 A1    Aug. 14, 2008

(30) Foreign Application Priority Data

Feb. 9, 2007 (DE) .......................... 10 2007 007 135

(51) Int. Cl.
*B60C 23/00* (2006.01)

(52) U.S. Cl. ........ 340/447; 340/442; 340/444; 340/445; 340/449; 73/146.2; 73/146.5

(58) Field of Classification Search .................. 340/447, 340/442, 444, 445, 449; 701/29, 30; 73/146, 73/146.2, 146.4, 146.5; 116/34 R
See application file for complete search history.

(56) References Cited

U.S. PATENT DOCUMENTS

| 5,602,524 | A | 2/1997 | Mock et al. |
| 7,224,267 | B1 * | 5/2007 | Ellis ............................... 340/442 |
| 7,512,467 | B2 * | 3/2009 | Watabe ........................... 701/29 |
| 7,528,708 | B2 * | 5/2009 | Saitou et al. .................. 340/449 |
| 7,535,347 | B2 * | 5/2009 | Larson et al. ............. 340/457.4 |
| 2003/0164760 | A1* | 9/2003 | Nantz et al. ................... 340/447 |
| 2004/0178897 | A1 | 9/2004 | Fennel et al. |

FOREIGN PATENT DOCUMENTS

| DE | 42 05 911 A1 | 9/1993 |
| DE | 102 43 914 A1 | 5/2003 |
| WO | 03/006268 A1 | 1/2003 |

* cited by examiner

*Primary Examiner* — Hung T. Nguyen
(74) *Attorney, Agent, or Firm* — Laurence A. Greenberg; Werner H. Stemer; Ralph E. Locher (57) ABSTRACT

A tire monitoring system in or for a vehicle for determining tire-specific parameters has a distributed bus architecture. At least one intelligent receiving device is configured to receive transmit signals of a wheel electronic system. The receiving device has a signal processing device that carries out an evaluation of the received transmit signals and/or an evaluation of received signals of another subscriber of the bus architecture. The invention also relates to methods for operating the intelligent receiving devices of a distributed bus architecture of the novel tire monitoring or tire pressure system.

19 Claims, 4 Drawing Sheets

TIRE MONITORING SYSTEM AND METHOD

CROSS-REFERENCE TO RELATED APPLICATION

This application claims the priority, under 35 U.S.C. §119, of German patent application DE 10 2007 007 135.5, filed Feb. 9, 2007; the prior application is herewith incorporated by reference in its entirety.

BACKGROUND OF THE INVENTION

Field of the Invention

The invention lies in the automotive technology field. More specifically, the invention relates to a tire monitoring system in or for a vehicle, for determining tire-specific parameters. The invention further relates to a method for operating intelligent receiving devices of a distributed bus architecture of a tire monitoring system according to the invention.

The present invention refers to systems for monitoring or determining tire-specific parameters such as for instance the tire temperature, the tire pressure, the rotational speed of a tire, the tread depth, etc. Such systems are generally described as tire pressure monitoring systems. The invention also naturally refers to systems that determine the mounted position of a tire with reference to an automobile. An appropriate method is generally also described as wheel localization and the corresponding systems as localization systems. The invention and its underlying problem is explained below with reference to tire pressure monitoring systems, but without in effect limiting the invention.

Since vehicle safety and reliability are central factors in automotive engineering, for safety reasons alone the tire pressure of automobiles must be regularly checked. This is frequently neglected. For this reason, modern automobiles have, among other things, tire pressure monitoring systems which measure the tire pressure automatically and are intended to promptly detect a critical deviation in the measured tire pressure from a nominal value of tire pressure. This is displayed to the driver of the automobile. A manual check can therefore be dispensed with.

Typically, such a tire pressure monitoring system has at least one wheel sensor assigned to a respective wheel. Such a wheel sensor is designed to record a tire-specific parameter of a wheel assigned to this wheel sensor in each case and to transmit information derived from this measured parameter value. For this measurement, the wheel sensor is positioned either in the area of the wheel rim or integrated in the rubber material of the tire, for example it is vulcanized into the rubber of the tire. For the pre-evaluation and relaying of the recorded information to be transmitted, the wheel sensor contains a wheel electronic system especially provided for this purpose, which is fitted with an external transmitting antenna, via which the information can be transmitted. For the transmission of this information the wheel electronic system typically uses contactless radio transmission employing an RF signal transmission protocol.

At the vehicle, the tire pressure monitoring system has at least one receiving device which receives the radio signals transmitted by the wheel electronic system and relays them to a central processor unit that is positioned in a control unit especially provided for this purpose.

A common problem with tire pressure monitoring systems in general, but also in systems for wheel localization, arises in the wireless communication between the sensor on the wheel and the receiver on the vehicle. Moreover, since this communication between the sensor and the receiver is carried out during the operation with wheels moving at varying speeds, data communication is significantly impeded, especially at very high speeds. In addition, in this communication between sensor and receiver, other undesirable interference signals can be superposed on the transmitted signals, thereby leading to a corruption of the received signal. This is especially disadvantageous when other passenger automobiles are also fitted with these types of tire monitoring systems and transmit signals. The body of the automobile can also contribute to the degrading of this communication, especially if the receiver is positioned at such a point in the body that is not, or not always, in a direct data communication path with the transmitter of the wheel sensor when the automobile is in service.

For this reason, in tire pressure monitoring systems in current use the corresponding receiving devices are positioned in the vicinity of a respective wheel and therefore in close proximity to the corresponding wheel electronic system which contains the transmitter. For example, in the case of a passenger vehicle, its wheel well has proved to be a particularly favourable mounting site for this. In this case the receiving device at the vehicle is located in close proximity to the transmitting device on the wheel. In the case of a passenger vehicle, the corresponding tire pressure monitoring system thus has a total of four RF receiving devices positioned in the wheel wells, which pick up the RF signals transmitted by the transmitter on the wheel. In this way, these receiving devices are able to ensure relatively secure data communication with the wheel electronic system.

Here the various receiving devices of a tire pressure monitoring system are linked via a bus system to the central processing unit inside the control unit. If a receiving device now receives a signal transmitted by the sensor, then this received signal is relayed by the receiving device to the processing unit via the bus. The problem here is that when these signals are received and relayed, no distinction is made as to whether or not this received signal originates from the wheel electronic system assigned to the respective receiving device. Normally, because of the spatial proximity this received signal alone actually originates from the respective assigned wheel sensor. Of course in the case of wheel axles that are very close to each other, as occurs in very small passenger automobiles or sometimes also in trucks, for example, it can happen that a receiving device receives a transmitted signal from another wheel electronic system. This received signal is then immediately relayed via the bus. Verification by the receiving device as to whether or not this signal is now coming from the respective, assigned "correct" wheel electronic, does not take place. This verification is carried out only in the processing unit.

This is undesirable since the signals wrongly relayed by the receiving device are either not required by the processing unit or, since these were possibly also additionally received by the "correct" receiving device, they are transmitted twice via the bus and are duplicated in the processing unit. All in all, due to the unwanted relaying of the "wrong" signal received by the receiving unit and the relaying of this "wrong" signal via the bus cable, this causes the bus utilization to increase. If the situation described above occurs very frequently, that is to say "wrong" signals are relayed very frequently, this causes a significant amount of bus utilization.

SUMMARY OF THE INVENTION

It is accordingly an object of the invention to provide a tire monitoring system, which overcomes the above-mentioned disadvantages of the heretofore-known devices and methods of this general type and which provided with improved and, in particular, more effective relaying of the signals received by the receiving device. It is a further object of the invention to provide for the relaying of the signals received by the receiving device with the lowest possible bus utilization.

With the foregoing and other objects in view there is provided, in accordance with the invention, a tire monitoring system in or for a vehicle for determining tire-specific parameters, the system having a distributed bus architecture. The tire monitoring system comprises:

a wheel electronic system configured to output transmit signals;

a plurality of subscribers of the distributed bus architecture, the subscribers including at least one intelligent receiving device configured to receive the transmit signals of the wheel electronic system;

the receiving device having a signal processing device for evaluating the received transmit signals and/or for evaluating received signals of other the subscribers of the distributed bus architecture.

In other words, there is provided, in accordance with the invention, a tire monitoring system in or for a vehicle for determining tire-specific parameters, which has a distributed bus architecture, with at least one intelligent receiving device that is designed to receive transmit signals of a wheel electronic system, it being possible for the receiving device to have a signal processing device that carries out an evaluation of the received transmit signals and/or an evaluation of received signals of other subscribers of the bus architecture.

With the above and other objects in view there is also provided, in accordance with the invention, a method of operating intelligent receiving devices of a distributed bus architecture of a tire monitoring system according to the invention, in which at least transmit signals received by a receiving device are processed and/or evaluated and relayed dependent upon this processing or evaluation.

The idea underlying the present invention consists in providing an extended-function, intelligent tire pressure system in a distributed bus architecture. This distributed bus architecture includes, in addition to a control unit which contains the central processing unit, several so-called "intelligent" receiving devices. According to the invention, these intelligent receiving devices are designed not just to receive and relay signals without appreciable evaluation; rather these intelligent receiving devices are also designed to at least carry out pre-processing and/or pre-evaluation of the received transmit signals. Dependent on this pre-evaluation or pre-processing, the received transmit signals are appropriately relayed or not. Where relaying occurs, the received transmit signals are not only relayed to the control unit but can also be fed to other intelligent or even non-intelligent receiving devices of the distributed bus architecture. This requires a further, likewise advantageous functionality of the intelligent receiving devices in such a way that, according to the invention, in addition to their receiving functionality, they are able to monitor and evaluate the bus or the information transmitted via the bus. This monitoring is carried out, on the one hand, on an existing signal transmitted via the bus and/or on its content, that is to say the information contained in these signals. In this way the different receiving devices can therefore also communicate with each other and, for example, tap off via the bus and make further use of information received and relayed by another intelligent receiving device, where this information is required.

In accordance with several preferred implementations of the novel concept, the following features may be provided in a variety of combinations: At least one receiving device is assigned to a wheel or wheel electronic system thereof. At least one receiving device is positioned in close proximity to the wheel electronic system assigned thereto. There are provided at least two receiving devices strategically distributed about the vehicle.

The term "other subscriber" may refer to another receiving device or a processor unit. In a preferred embodiment, the distributed bus architecture includes a bus, at least two receiving devices interfaced to the bus, and a processing unit for controlling the receiving devices and evaluating and processing the signals received and relayed by the receiving devices. The bus may be a single wire bus cable or a two-wire bus cable, and the at least two receiving devices are configured to communicate with the control unit and/or with one another via the bus.

In a further embodiment of the invention, a first group of receiving devices is provided, which is positioned in close proximity to the assigned wheel electronic system, and that, furthermore, a second group of receiving devices is provided, which is distributed about the vehicle. The receiving devices are assigned to a first and/or a second group of a respective wheel electronic system. In a preferred embodiment of the invention, the receiving device(s) is/are configured to monitor the bus and/or to evaluate signals transmitted via the bus.

The system is suited for monitoring several tire-specific or wheel-specific parameters, such as a tire pressure, a tire temperature, a rotational speed of a wheel, a depth of a tire tread, and a mounting position of a wheel with respect to the vehicle. The monitoring system is particularly suited as a tire pressure monitoring system for determining a tire pressure.

The advantages of this distributed bus architecture when using intelligent receiving devices include the following:

On the one hand the bus utilization can be significantly reduced by only relaying those data that are either required by another receiving device and/or the control unit. This can also prevent redundant data, that is to say data received twice by different receiving devices, from being transmitted twice via the bus, which likewise reduces the bus utilization.

In addition, it is therefore also possible to reduce the computing workload of the processing unit within the control unit according to demand, since at least one part of the evaluation and processing is already being carried out in a respective receiving device.

Other features which are considered as characteristic for the invention are set forth in the appended claims.

Although the invention is illustrated and described herein as embodied in a tire monitoring system and method, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE SEVERAL VIEWS OF THE DRAWING

Unless stated otherwise, structurally or functionally identical elements, features and signals are identified with the same reference numerals throughout the figures of the drawing.

DETAILED DESCRIPTION OF THE INVENTION

Figure 1:
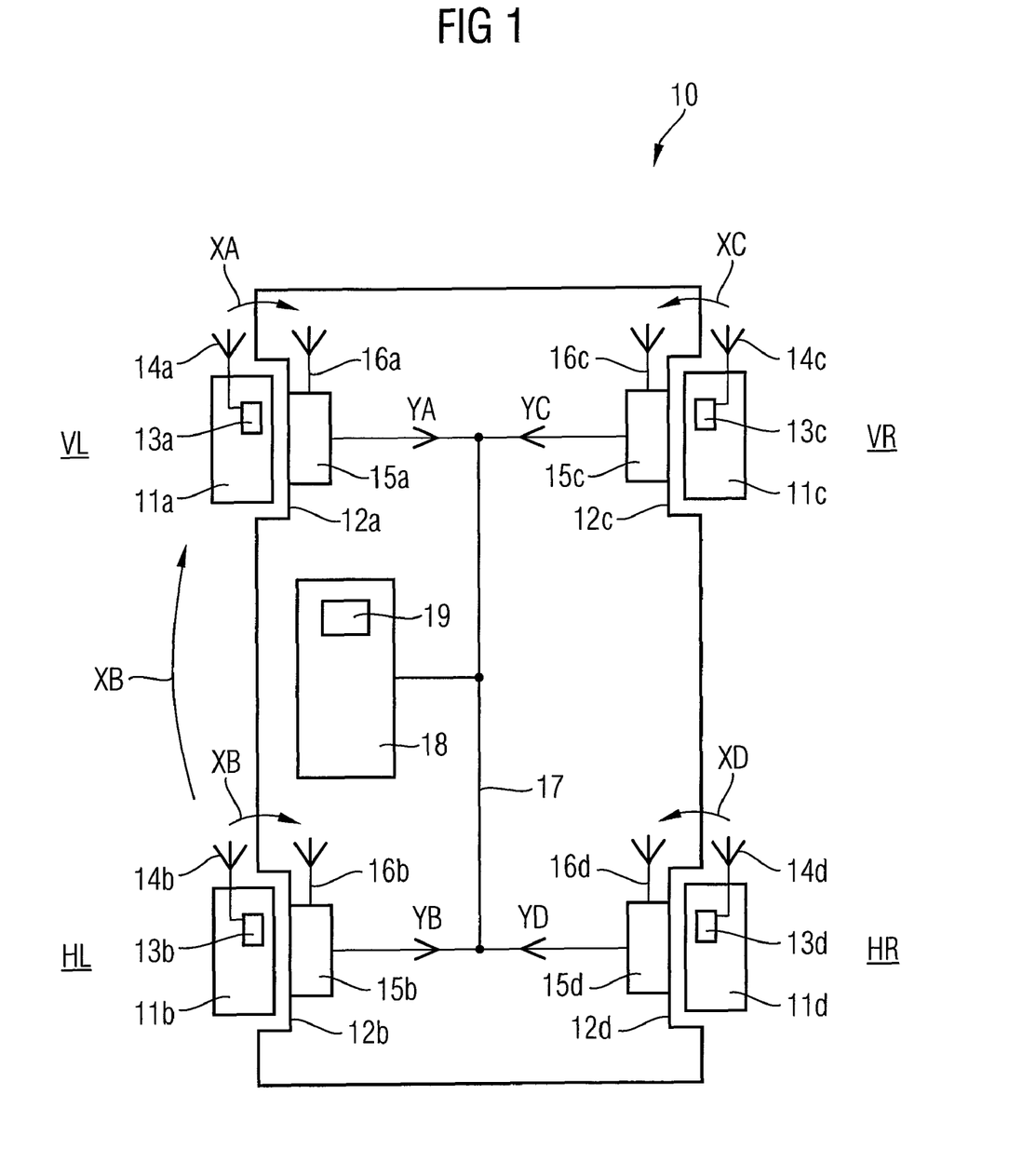
FIG. 1 shows a schematic plan view of a passenger automobile illustrating a first exemplary embodiment of the tire monitoring system according to the invention.

Referring now to the figures of the drawing in detail and first, particularly, to FIG. 1 thereof, the schematic plan view of a passenger automobile shows a first exemplary embodiment of a tire monitoring system according to the invention. The vehicle, for example a passenger automobile, is denoted by reference number 10. It will be understood that the invention is obviously also suitable for any vehicle, such as trucks, buses, trailers and the like.

In the present exemplary embodiment, the vehicle 10 has four wheels 11a-11d. The various positions of the wheels 11a-11d are marked VL (front left), VR (front right), HL (rear left), HR (rear right). Each of these wheels 11a-11d is located in a wheel well 12a-12d (i.e., a wheel arch), which constitutes a recess in the vehicle body provided especially for the respective wheel 11a-11d. The wheels are attached to respective axles, which are not illustrated.

The vehicle 10 has a tire monitoring system according to the invention, which in the present exemplary embodiment is designed as a tire pressure monitoring system for determining, for example, the tire pressure or another tire-specific parameter. Furthermore, the design of this tire pressure monitoring system is intended not only to determine the tire pressure data obtained in this way, but also evaluate and if necessary display these data. This tire pressure monitoring system has electronic wheel devices on the wheels, also referred to below as wheel electronic systems, receiving devices on the vehicle, a bus, and a control unit. These elements of the tire pressure monitoring system, as well as their positions and functions are explained below:

A wheel electronic system 13a-13d is assigned to each individual wheel. This wheel electronic system 13a-13d can for example, be located in the known manner inside each respective tire, that is to say in its rubber material and/or in the region of the valve or rim of the wheel 11a-11d. A respective wheel electronic system 13a-13d typically contains a wheel sensor, designed to determine wheel-specific parameters such as tire pressure, tire temperature, rotational speed of a wheel, tire tread depth, for example, and also other parameters if necessary. Furthermore, the wheel electronic system 13a-13d contains a circuit arrangement which pre-evaluates the data thus obtained from the wheel sensor and conditions this data for onward routing. This conditioning typically provides modulation and coding. The data determined by the wheel electronic system 13a-13d are modulated or encoded onto a transmitting signal XA-XD and transmitted to the vehicle 10 via a wireless communications link. For this purpose, each wheel electronic system 13a-13d contains its respective transmitting antenna 14a-14d. The transmit signals XA-XD, which are designed as RF radio signals, for example, are transmitted by way of the transmitting antennas.

Figure 2:
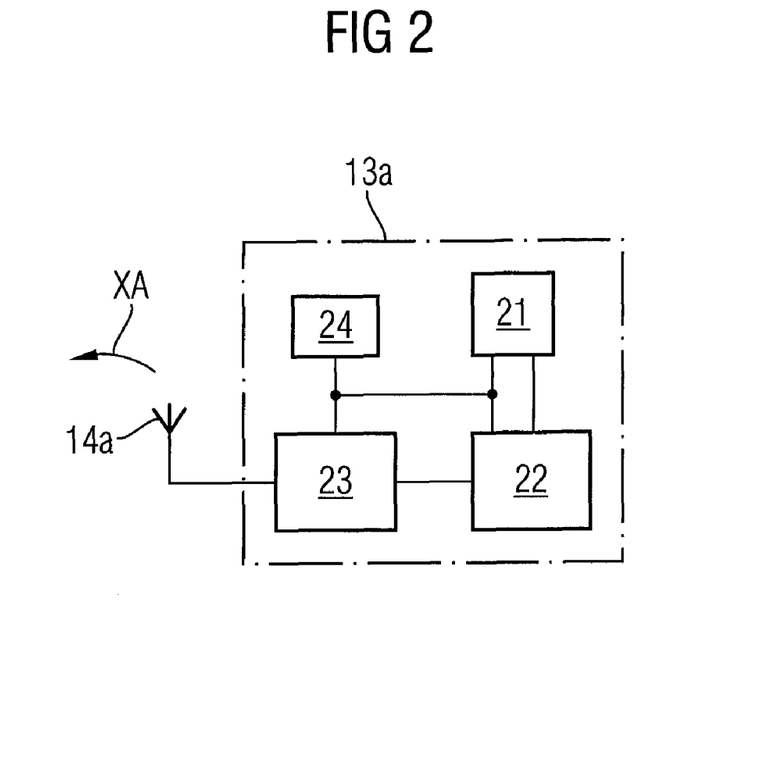
FIG. 2 is a block diagram of an exemplary construction of a wheel electronic system on a wheel.

By means of a schematic block diagram, FIG. 2 shows an exemplary construction of a wheel electronic system 13a. In the present exemplary embodiment, this wheel electronic system 13a has a pressure sensor 21, a processing unit 22 connected to the pressure sensor 21 and a transmitter 23 connected to the processing unit 22, each of which is supplied with electrical power from a local power supply 24, for example an accumulator or a battery. This wheel electronic system 13a is intended to measure the current tire pressure of the respective wheel by means of the pressure sensor 21. The processing unit 22 is intended, among other things, to generate a message relating to the measured tire pressure in the form of the transmit signal XA and then to wirelessly transmit this message to the receiving device 15a by means of the transmitter/receiver 23. This transmit signal XA is transmitted, for example, by means of a high-frequency carrier signal, a frequency above 200 MHz, preferably 315 MHz or 433.92 MHz, for example. In addition, in the case of the present exemplary embodiment, the message can contain information for identifying the corresponding wheel electronic system 13a, for example in the form of a coded and/or modulated identification.

In order to receive these transmit signals XA-XD, the tire pressure monitoring system has several receiving devices 15a-15d on the vehicle, each of which includes a receiving antenna 16a-16d. In the present case, a total of four receiving devices 15a-15d are positioned in the region of the wheel wells 12a-12d and are therefore in close proximity to the respective wheel electronic systems 13a-13d. These receiving devices 15a-15d receive the transmitted signals XA-XD via the respective receiving antennas 16a-16d.

Figure 3:
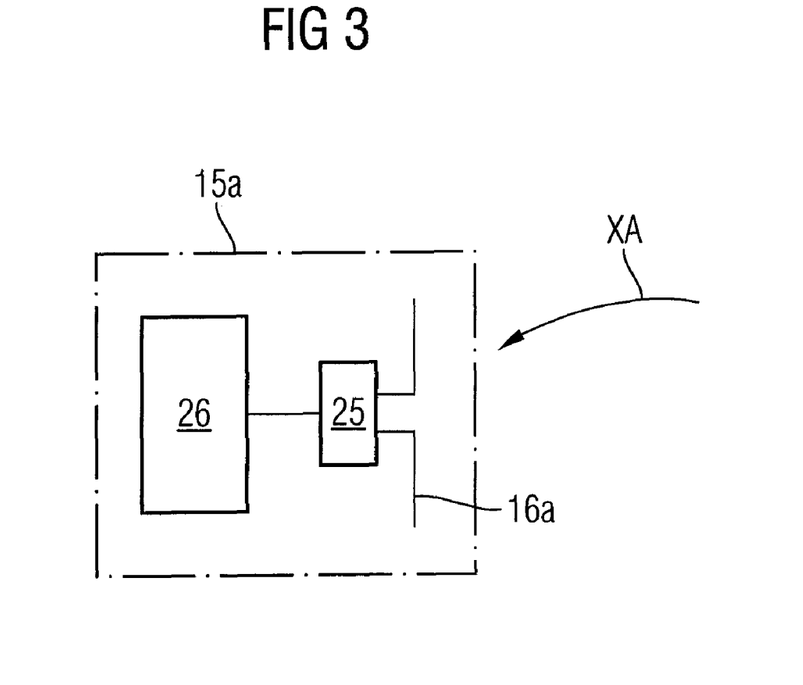
FIG. 3 is a block diagram of an exemplary embodiment of a receiving device on a vehicle.

With the aid of a block diagram, FIG. 3 shows an exemplary construction of a receiving device 15a on the vehicle. The receiving device 15a is supplied with electrical power from a power source in the vehicle 10, not shown, and in each case has a receiving antenna 16a, a receiving stage 25 connected to the receiving antenna 16a and a microprocessor 26 as an example of a signal processing device.

The control unit 18, the receiving devices 15a-15d and the wheel electronic system 13a-13d are intended to measure the respective tire pressures, for example within specified time slots, to evaluate the measured tire pressures and to inform a person driving the passenger automobile, not shown in detail here, if one of the tires has too low a pressure, for example. This person can then be suitably informed, for example by means of a visual indicating device or audible device in the passenger automobile, it also being possible for the indicating device to indicate which of the tires has too low a pressure. This is particularly advantageous when the tire pressure monitoring system is additionally equipped with a localization function which allows the received data to be assigned to the respective tire.

This positioning of the receiving devices 15a-15d in close proximity to the respective wheel 11a-11d (exemplary embodiment in FIG. 1) has the advantage that the transmit signals XA can also then be received with a relatively high degree of certainty, if these are transmitted with low transmitter power.

Furthermore, the wheel electronic system has a bus 17, for example a single- or twin-wire CAN (Controller Area Network) bus, to which each of the receiving devices 15a-15d is interfaced via respective connecting cables. A control unit 18 which contains a central processing unit 19, is likewise interfaced to this bus 17. This central processing unit 19 can, for example, be a program-controlled device such as a microprocessor or microcomputer or also, for instance, a hard-wired logic circuit, such as an FPGA or PLD, for example. This control unit 18, or the processor unit 19 provided within it, the bus 17, as well as the receiving devices 15a-15d, together form a bus system. Via this bus system, the transmit signals XA-XD received by the respective receiving devices 15a-15d can be fed to the control unit 18, using the bus 17. In addition, the control unit 18 is also able to control the respective receiving devices 15a-15d.

In an additional, particularly advantageous embodiment, the various receiving devices 15a-15d can communicate via the bus 17 not only with the control unit 18, but also with each other. This requires a certain "intelligence" of the respective receiving devices 15a-15d, that is to say these receiving devices 15a-15d must also be designed to receive, and at least partially process, relayed transmit signals YA-YD of other receiving devices 15a-15d. This requires the respective receiving device 15a-15d to have the capability to not only send transmit signals XA-XD via the bus 17, but also to monitor the bus 17 for the presence of relayed transmit signals YA-YD.

Furthermore, it can likewise be advantageous if the receiving devices 15a-15d carry out a pre-evaluation of the received transmit signals XA-XD, as well as an appropriate evaluation. This additional functionality of the receiving devices 15a-15d is described in detail below.

This extended function of the receiving devices 15a-15d produces a distributed bus architecture since here the evaluation and processing is no longer carried out exclusively in the control unit 18 or in the processing unit 19 contained within it, but also partially or fully by individual or several receiving devices 15a-15d.

Typical unidirectional data communication due to transmission at the wheel and reception at the vehicle of the transmit signal XA takes place between a respective wheel electronic system, for example the wheel electronic system 13a, and the receiving device 15a assigned to it. Bidirectional data communication, for example according to a known challenge-response method, in which the receiving device 15a first sends a challenge signal to the wheel electronic system 13a and a response to this request is sent back by the wheel electronic system 13a, can also be considered of course. Moreover, in this bidirectional data communication other data can also be exchanged between the wheel electronic system 13a and the receiving device 15a.

Figure 4:
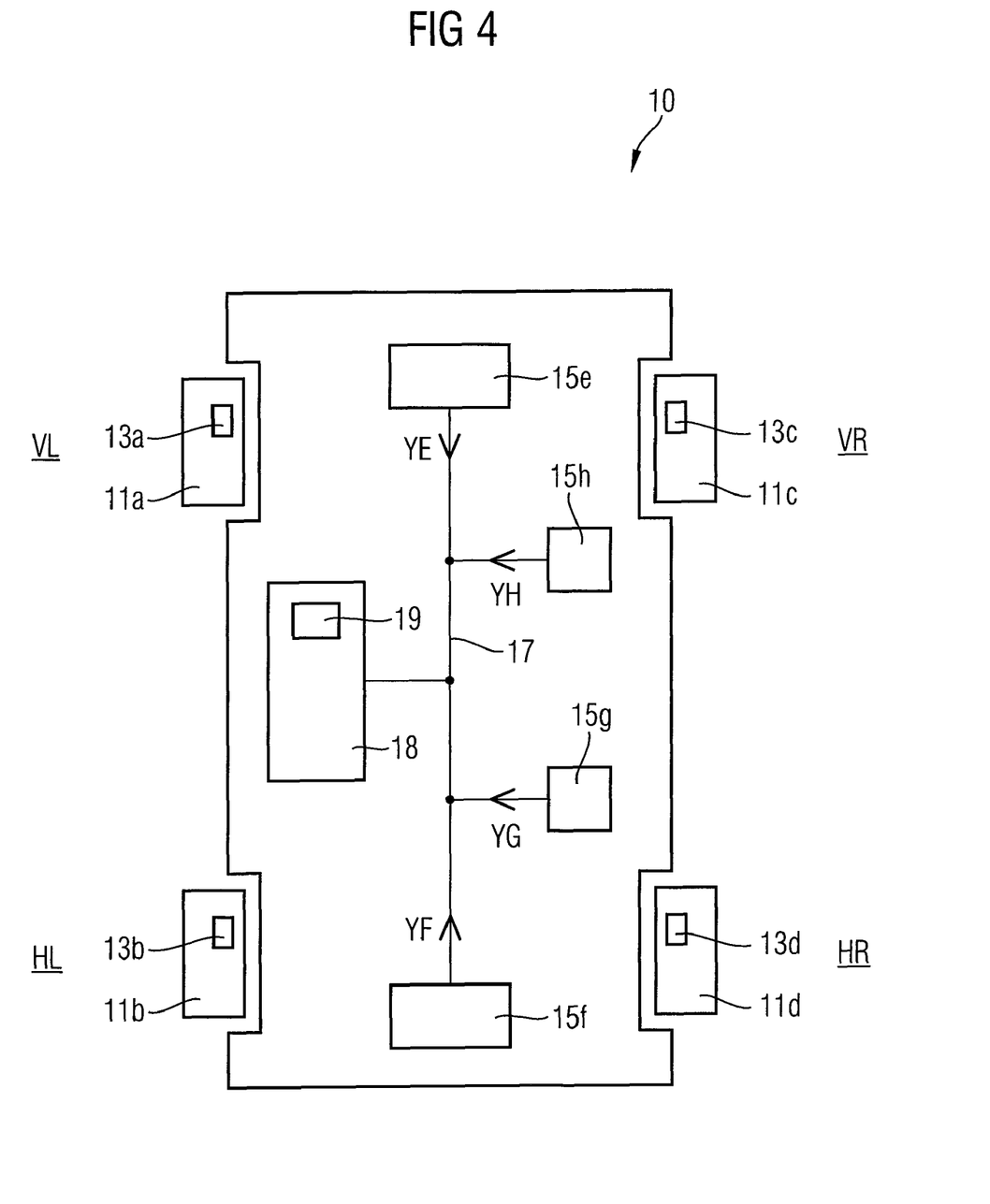
FIG. 4 is a schematic plan view of a passenger automobile illustrating a second exemplary embodiment of the tire monitoring system according to the invention.

With the aid of a plan view of a passenger automobile, FIG. 4 shows a second exemplary embodiment of a tire monitoring system according to the invention. In contrast to the exemplary embodiment in FIG. 1, here the receiving devices are not positioned in close proximity to the respective wheel 11a-11d. Here, in the present exemplary embodiment, by way of example only four receiving devices 15e-15h are provided, which are in a distributed arrangement around the automobile 10. It is not absolutely necessary for their positioning to correspond to the arrangement shown in FIG. 4; this can also be distributed in another way. Also, their number is not limited to four. Indeed, more or less, in particular less than 4 receiving devices 15e-15h can be provided. Each of these receiving devices 15e-15h is designed in a similar way to the receiving device 15a shown in FIG. 3 and interfaced via connecting cables to the common bus 17.

Figure 5:
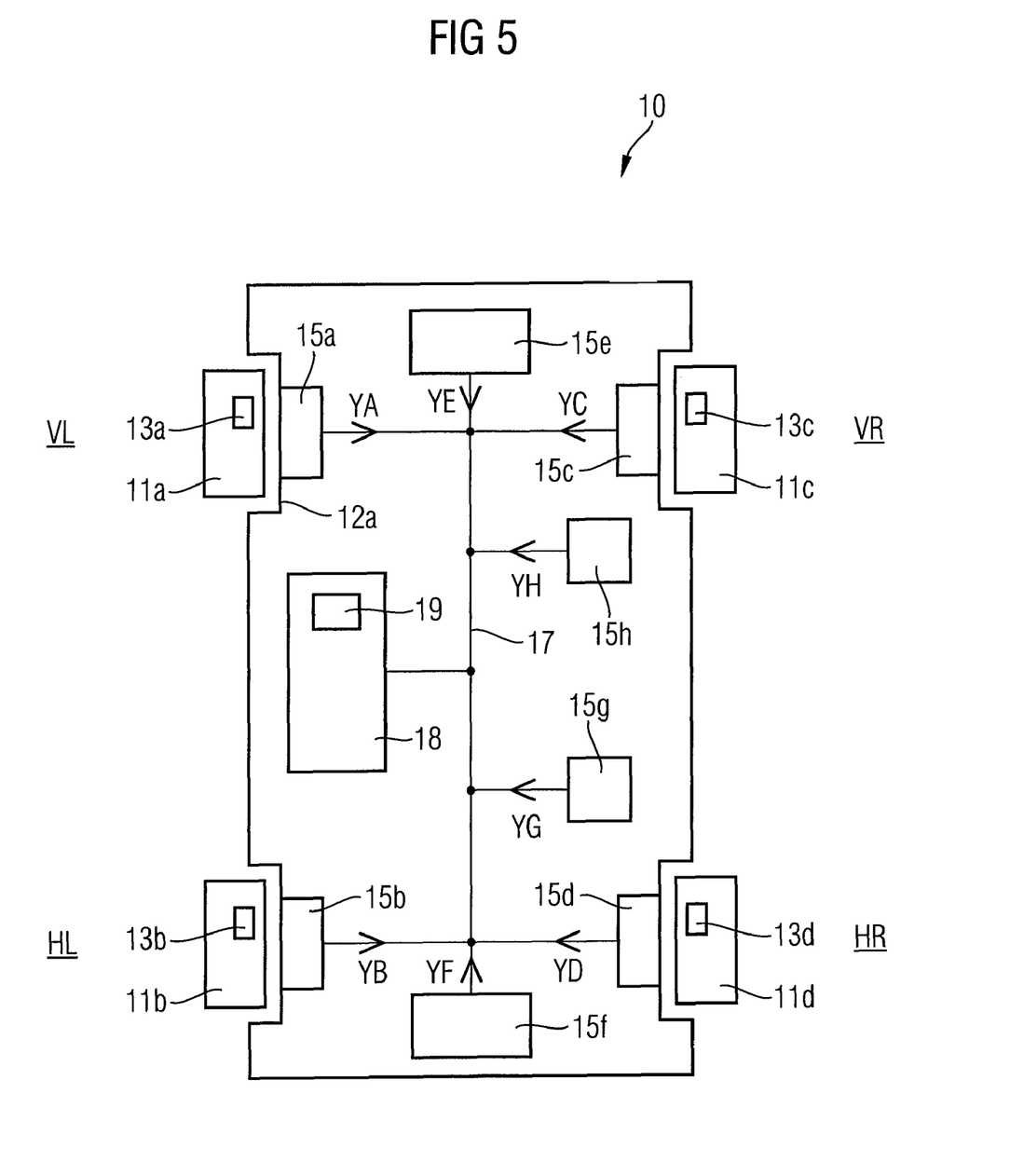
FIG. 5 is a schematic plan view of a passenger automobile illustrating a third exemplary embodiment of the tire monitoring system according to the invention.

With the aid of a plan view, FIG. 5 shows a third exemplary embodiment of a tire monitoring system according to the invention. In contrast to the two exemplary embodiments in FIGS. 1 and 4, here the tire monitoring system contains a total of eight receiving devices 15a-15h, and again in this case it is intended that their number can be extended or reduced as required. In the exemplary embodiment of FIG. 5, the two variants of the positioning and distribution of the receiving devices 15a-15h from FIGS. 1 and 4 are combined together. That is to say in this case a first group of receiving devices 15a-15d is provided, which according to the exemplary embodiment in FIG. 1, is positioned in close proximity to the respective, assigned wheel 11a-11d and is thus positioned in the vicinity of the wheel well 12a-12d. Furthermore, a second group of receiving devices 15e-15h is provided, which is more or less freely distributed around the automobile, as shown in the exemplary embodiment in FIG. 4.

In the two exemplary embodiments in FIGS. 4 and 5 the various receiving devices 15e-15h distributed in the passenger automobile 10 are each assigned to a wheel 11a-11d. Additionally or alternately, it could also be considered in this case not to assign the various receiving devices 15e-15h to one respective wheel 11a-11d, but to a plurality of wheels 11a-11d, or that there is no fixed assignment.

An intelligent concept of a tire pressure monitoring system is provided in the present invention, whereby the data received by the receiving devices 15a-15h are relayed and further processed via the bus system. Provided that inventive "intelligent" receiving devices 15a-15h are provided, this concept is relatively easy to implement. The essential element of this concept is that the intelligent receiving devices 15a-15h do not simply apply the received transmit signals to the bus cable 17 and thereby feed them to the control unit 18, as is the case with known receiving devices. Rather, in this case, a pre-evaluation of the received signals XA-XD takes place in the respective receiving devices 15a-15h. This re-evaluation can be carried out in a variety of ways, depending on how the entire bus system of the tire pressure monitoring system is to be designed. This is briefly described below with the aid of a few examples:

In a first application all receiving devices 15a-15d, are positioned in close proximity to the respective wheel 11a-11d, as shown in the exemplary embodiment in FIG. 1. The receiving devices 15a-15d receive the transmit signals XA-XD transmitted by the respective, assigned wheel electronic system 13a-13d and feed these received transmit signals via the bus 17 to the control unit 18. However, it can also be the case that, for example, the receiving device 15a receives a transmit signal XB from a wheel electronic system other than the wheel electronic system 13a assigned to it. In this case, the receiving device 15a carries out an evaluation of this received signal XB. In this evaluation, the receiving device 15a can determine, for example via the identification contained in the transmit signal XB, from which wheel electronic system 13a-13d this transmit signal XB is coming, or at least determine that this transmit signal XB is not coming from the wheel electronic system 13a assigned to it. If this is determined by the receiving device 15a, then this received transmit signal XB is not fed via the data bus 17 to the control unit 18.

Provision could also be made in a variant for the receiving device 15a to forward this received transmit signal XB of the corresponding, assigned receiving device 15b.

Additionally or alternatively, provision can also be made for the receiving device 15a to send this received transmit signal XB to the control unit 18, instead of the receiving device 15b, together with the information that this received transmit signal XB does not come from the wheel electronic system 13a, but from the wheel electronic system 13b.

All in all, in this case there is therefore no direct relaying of the received transmit signals XA-XD, rather, prior to onward transmission these received transmit signals XA-XD are at least verified in the respective receiving device 15a-15d, to ascertain whether they come from the respective, assigned wheel electronic system 13a-13d.

Advantageously, the bus utilization can be reduced in this way since "false" data are not relayed via the bus 17, and consequently the bus 17 remains free from undesirable utilization at least more frequently.

In a second typical application, the receiving devices are distributed around the passenger automobile 10, as shown in the exemplary embodiment in FIG. 4. In this case, for example, the various receiving devices are not assigned to a specific wheel 11a-11d. Each of the receiving devices 15e-15h is designed to receive transmit signals XE-XH. These received transmit signals are applied to the bus 17 in the form of signals YE-YH and can therefore be evaluated in the control unit 18. In addition, these receiving devices 15e-15g are designed to recognize those respective signals YE-YH, which are transmitted via the bus 17 as such. Each of the receiving devices 15e-15h is therefore designed to determine whether received signals YE-YH which were received and relayed by another receiving device 15e-15g are present. If this is the case, then a respective receiving device can receive via the bus 17 the information required by it, which for example comes from a wheel electronic system 13a-13d assigned to it, and, depending on the application, make further use of or further process this information.

For example, information in the received signal can be data that indeed was received by a receiving device 15e-15h, but is required by another receiving device 15e-15g. In this case, the receiving device 15e-15h that actually requires this information takes this information from the received signal that is located on the bus.

The particular advantage of this embodiment is that the risk of losing data in the bus system is significantly reduced, since it is always possible that precisely this information has already been received by another receiving device. For example, this is then the case if a receiving device is unable to receive the respective, transmitted signal because of a faulty transmission path between the wheel electronic system and this receiving device, for example. Here it is always possible that this transmit signal is received via at least one other receiving device at which an undisturbed transmission path exists to the above-mentioned wheel electronic system. In this case the receiving device can then relay this received information to the receiving device that requires this information.

It is obvious that this functionality can be used not necessarily only for distributed receiving devices according to the exemplary embodiment in FIG. 4, but also for receiving devices in close proximity to the wheel wells, as in the exemplary embodiment in FIG. 1 and obviously also for the exemplary embodiment of FIG. 5.

A further advantage is that non-relevant data, which, for example, are also transmitted by other road users, for example other automobiles, and are received via the respective receiving devices 15a-15d in the vehicle 10, are received as such and are therefore not relayed.

In an alternate embodiment, those data that are not required by the entire system, that is to say by the remaining receiving devices and/or by the control unit 18, are likewise not relayed. Therefore only those data that are required at least by another receiving device 15a-15h and/or the control unit 18 are relayed by the respective receiving device 15a-15h. In this case this also requires that all receiving devices 15a-15h are designed to monitor the bus 17, to ascertain whether data destined for them are located on the bus 17.

In a further embodiment it can happen, particularly in a distributed architecture as illustrated in FIGS. 1, 4 and 5, that a transmit signal XA transmitted by a wheel electronic system 13a is received by at least one receiving device 15a-15h. In this case, provision is made according to the invention for this received transmit signal XA to be applied to the bus 17 by only one of the receiving devices 15a-15d and thus fed to the entire bus system. In this case the remaining receiving devices would not apply the received transmit signal XA to the bus 17. This embodiment also requires that each of the receiving devices 15a-15d is designed to be intelligent and therefore not only designed to receive and relay the transmit signals XA-XD, but also to be able to monitor the bus 17 in order to ascertain whether or not another receiving device 15a-15d has, for example, received the same transmit signal XA and already applied it to the bus 17. The bus utilization is also reduced, mainly because in this way redundant data are not transmitted via the bus.

This arrangement also significantly reduces the bus utilization, in particular when a plurality of these receiving devices 15a-15h are provided in a tire monitoring system and/or when the transmit signals XA-XD are transmitted at high transmitter power and/or when there is little interference on the transmission path between the wheel electronic system and the receiving device.

It is obvious that the above-mentioned exemplary embodiments and variants for operating the "intelligent" receiving devices 15a-15h within the distributed bus architecture can also be combined together and, in particular, can also be used in all the different exemplary embodiments of FIGS. 1, 4, and 5.

Although the present invention was described above with the aid of preferred exemplary embodiments, it is not limited to them, but can be modified in a variety of ways.

Even though the invention has been described above with reference to a tire pressure sensor system, the invention is not exclusively limited to the determination of the tire pressure; rather, every device that determines information from which the fault condition possibly occurring at the wheel, or other tire characteristics can be detected, can be considered as a wheel electronic system. In the present connection, the term "fault condition" should be loosely interpreted and covers all conditions, characteristics and data of a respective wheel that are considered worthy of detection, for example also the characteristics such as tire temperature, angular velocity, angular acceleration, tire tread depth, etc. as already mentioned in the introduction.

The invention is also in particular not limited to a tire pressure monitoring system, but can also be extended to other tire monitoring systems, such as a system for the localization of the mounting position of a wheel with respect to the vehicle, for example.

The present invention was also described above with the aid of a tire monitoring system in which the transmitter (without a request by the control unit) sends tire-specific parameters in the transmit signal to the respective, assigned receiver, it being possible in this case that the receiver does not necessarily send back an acknowledgement signal. Here the invention can also be extended to those tire pressure systems that are designed using transponder technology, it being possible in this case for the transponders to be designed as active, passive or semi-passive transponders. The terms "passive" and "active" refer to the type of transponder power supply, it being possible that the transponder in the first case does not have its own power supply and in the second case has at least one chargeable battery. Here the data communication between transmitter and receiver is effected as is usual in transponder technology by means of a known challenge-response method, it being possible in this case for the transponder on the wheel to typically use backscatter technology to return the transmit signals.

In particular, the invention is also not limited to the special numerical and frequency values, but within the scope of the invention can obviously also be used with low-frequency and/or high-frequency transmit signals having other transmission frequencies.

It is possible to realize a tire monitoring system in a distributed architecture by using an "intelligent" receiving device according to the invention. For example, by doing this it is possible to significantly extend the functionality of the receiving device so that, for example, a warning algorithm is automatically executed by the receiving device which receives a fault condition received via a transmit signal. In this case, the control unit or the program-controlled device located within it is updated by the respective receiving devices, only with the necessary data, such as the display data, warning status etc., for example, which results in the computing work of this processing unit being significantly reduced. Here the computing power is partly shared by the distributed receiving devices. This is a particular advantage when the control unit is also designed to fulfill other functions which are not part of the tire monitoring system. In this case the control unit would be activated only in exceptional circumstances and would therefore be available to the other vehicle functions.

Here a control unit for restraining means, safety systems and such like, or even an engine control device, for instance, can be used as a control unit.

It is possible by means of the inventive receiving device that this receiving device carries out (pre-) processing of the received transmit signals if this is required, or additionally or alternately also relays these received transmit signals via the bus, so that these are processed by another intelligent receiving device and/or the control unit, for example.

The invention claimed is:

1. A tire monitoring system in or for a vehicle for determining tire-specific parameters, the system having a distributed bus architecture and comprising:
    a wheel electronic system configured to output transmit signals, said wheel electronic system assigned to only one particular wheel of the vehicle;
    a plurality of subscribers of the distributed bus architecture, said subscribers including at least one intelligent receiving device configured to receive the transmit signals of said wheel electronic system, said wheel electronic system assigned only to said receiving device; and
    a bus connected to said receiving device;
    said receiving device having a signal processing device for evaluating the received transmit signals and/or for evaluating received signals of other said subscribers of the distributed bus architecture;
    said receiving device feeding the received transmit signals to said bus only when the received transmit signals have been transmitted by said wheel electronic system assigned to said receiving device.

2. The tire monitoring system according to claim 1, wherein at least one receiving device is assigned to a wheel or wheel electronic system thereof.

3. The tire monitoring system according to claim 1, wherein at least one receiving device is positioned in close proximity to said wheel electronic system assigned thereto.

4. The tire monitoring system according to claim 1, wherein said receiving device is one of at least two receiving devices distributed about the vehicle.

5. The tire monitoring system according to claim 1, wherein another said subscriber is another receiving device or a processor unit.

6. The tire monitoring system according to claim 1, further comprising: at least two said receiving devices interfaced to said bus, and a processing unit for controlling said receiving devices and evaluating and processing the signals received and relayed by said receiving devices.

7. The tire monitoring system according to claim 6, wherein said bus is formed with a single wire bus cable or a two-wire bus cable.

8. The tire monitoring system according to claim 6, wherein said at least two receiving devices are configured to communicate with said processing unit and/or with one another via said bus.

9. The tire monitoring system according to claim 1, wherein a first group of receiving devices is disposed in close proximity to the assigned wheel electronic system, and a second group of receiving devices is distributed about the vehicle.

10. The tire monitoring system according to claim 9, wherein said receiving devices are assigned to a first and/or a second group of a respective wheel electronic system.

11. The tire monitoring system according to claim 1, wherein said receiving device is configured to monitor the bus and/or to evaluate signals transmitted via a bus of said bus system.

12. The tire monitoring system according to claim 1 configured to monitor a wheel-specific parameter selected from the group consisting of a tire pressure, a tire temperature, a rotational speed of a wheel, a depth of a tire tread, and a mounting position of a wheel with respect to the vehicle.

13. The tire monitoring system according to claim 1, configured as a tire pressure monitoring system for determining a tire pressure.

14. A method of operating intelligent receiving devices of a distributed bus architecture, which comprises:
    providing a tire monitoring system including:
        a wheel electronic system configured to output transmit signals, the wheel electronic system assigned to only one particular wheel of the vehicle,
        a plurality of subscribers of the distributed bus architecture, the subscribers including at least one intelligent receiving device configured to receive the transmit signals of the wheel electronic system, the wheel electronic system assigned only to the receiving device, and
        a bus connected to the receiving device,
        the receiving device having a signal processing device for evaluating the received transmit signals and/or for evaluating received signals of other the subscribers of the distributed bus architecture,
    processing and/or evaluating the received transmit signals with the receiving device; and
    feeding the received transmit signals from the receiving device to the bus only when the receiving device determines that the received transmit signals have been transmitted by the wheel electronic system assigned to the receiving device.

15. The method according to claim 14, which comprises: when a receiving device receives a transmit signal from a wheel electronic system other than from the wheel electronic system assigned thereto, evaluating the transmit signal thus received in the receiving device and/or relaying the transmit signal to the processing unit and/or to the receiving device assigned to the specific wheel electronic system.

16. The method according to claim 14, which comprises determining with a receiving device whether transmit signals that are received from another receiving device and relayed via the bus are present on the bus, and wherein, in that case, the receiving device receives via the bus signals intended for it.

17. The method according to claim 14, which comprises relaying with a receiving device only those signals that are required by at least one other receiving device and/or by the processing unit.

18. The method according to claim 14, which comprises relaying via the bus received transmit signals, each of which contains similar or identical data, to the processing unit only by a unique receiving device.

19. The method according to claim 14, which comprises relaying via the bus received transmit signals with similar or identical data from the same wheel electronic system only by a unique receiving device.

* * * * *